United States Patent [19]

Mikina Stanley J.

[11] 4,162,084

[45] Jul. 24, 1979

[54] EXERCISING BICYCLE

[76] Inventor: Stanley J. Mikina, Berna-Knoll 21, Rte. 2, Hendersonville, N.C. 28739

[21] Appl. No.: 873,007

[22] Filed: Jan. 27, 1978

[51] Int. Cl.² .......................... B62K 17/00 B62L 1/10;
[52] U.S. Cl. ...................................... 280/229; 188/24; 188/26
[58] Field of Search ...................... 280/229; 188/24-26

[56] References Cited

U.S. PATENT DOCUMENTS

| 499,009 | 6/1893 | Bunker | 280/229 |
|---|---|---|---|
| 3,152,813 | 10/1964 | Brown | 280/229 X |
| 3,292,946 | 12/1966 | Melson | 280/229 |
| 3,455,415 | 7/1969 | De Pew | 188/24 |
| 3,717,361 | 2/1973 | Vanderpool | 280/229 |
| 3,861,714 | 1/1975 | Evans | 188/24 X |

Primary Examiner—Joseph F. Peters, Jr.
Assistant Examiner—Donn McGiehan
Attorney, Agent, or Firm—William J. Ruano

[57] ABSTRACT

A bicycle is provided with wheels whose axle hubs are eccentric with respect to the wheel geometric center. A bicycle with such wheels and in forward motion will cause its rider to also oscillate up and down as the wheel axles rise and fall due to the wheel eccentricity. The purpose of such motions superposed on the forward travel motion is to exercise the rider's body more effectively by subjecting it to accelerations similar to those experienced in riding a horse.

1 Claim, 8 Drawing Figures

EXERCISING BICYCLE

This invention relates to an exercising bicycle. An outstanding disadvantage of the common bicycle as an exercising device is that only the legs are moved and the amount of body movement is negligible.

An object of the present invention is to overcome the abovementioned disadvantage.

A more specific object of the invention is to provide a bicycle which exercises the body of the driver more effectively by subjecting it to accelerations similar to that experienced in riding a horse.

Other objects and advantages of the invention will become more apparent from a study of the following specification taken with the accompanying drawings wherein.

Figure 1:
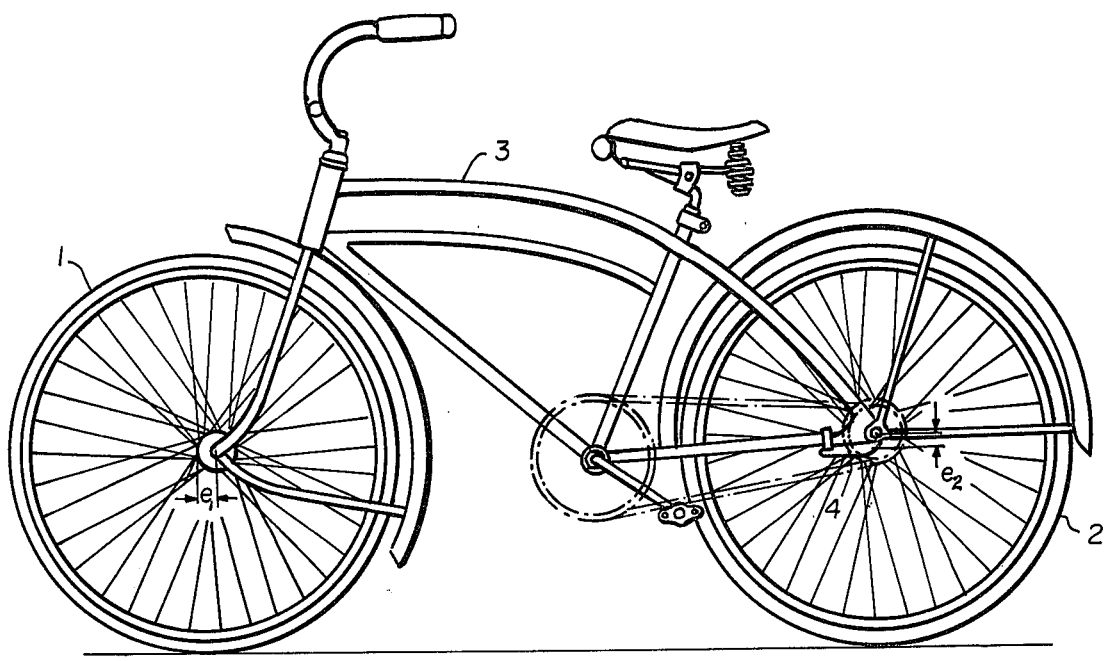
FIG. 1 is an elevational view of a bicycle having eccentrically mounted circular wheels embodying the present invention.

As shown in FIG. 1, a bicycle 3 of substantially standard frame design is equipped, in the general case, with a front wheel 1 having a hub eccentricity $e_1$, and a rear driving wheel 2 with an eccentricity $e_2$, with the eccentricity being defined as the radial distance that the center of the axle hub is displaced from the geometric center of the circular wheel. In a preferred embodiment, the wheel eccentricities may be made equal although in some situations they may be different.

During forward motion of the bicycle, these wheel eccentricities will provide a variety of compound oscillatory motions of the bicycle frame and rider as the phase of the wheel oscillations changes due to the gradual wheel creep angularly of one wheel relative to the other. For example, a straight vertical oscillation consisting of a frame translation will be produced when the wheel eccentricities are in phase. At the other extreme, a rocking motion of the bicycle frame in the vertical plane will occur when the wheel eccentricities are 180° out of phase. A combination of vertical translation plus angular rocking will be produced for intermediate values of eccentricity phase between the in phase and out-of-phase extremes.

The performance of the system of the present invention may be readily calculated since the oscillation is simple harmonic at each wheel. For example, with a forward bicycle velocity V and a wheel radius r, the angular wheel velocity is $$w = v/r \text{ radians/sec} \quad (1)$$

the oscillation frequency then is $$f = w/2\pi = v/2\pi r \text{ cycles/sec} \quad (2)$$

For a 26" dia. wheel and a forward velocity of 15 mph = 22 ft/sec.

$$f = 22 \times 12/2\pi \times 13 = 3.23 \text{ cycles/sec} \quad (3)$$

the oscillation frequency will be proportionally lower at lower forward speeds and higher at higher forward speeds than 15 mph. Thus, f=2.15 cycles/sec at 10 mph and 1.08 cyc/sec at 5 mph.

A quantity of particular significance in this invention is the magnitude of the vertical acceleration due to the wheel eccentricities. The acceleration at each wheel is $$A = w^2 e = (v^2/r^2)e \quad (4)$$

Again at 15 mph=22 ft./sec and a 26" dia. wheel:

$$A = (22 \times 12)^2/13^2 \, e = 412.4e \text{ inches/sec.}^2 \quad (5)$$

Since the acceleration of gravity if $g=387$ in/sec.$^2$ it is evident that the value of e that will make A just equal to g at 15 mph is $$e = 387/412.4 = 0.938 \text{ in} \quad (6)$$

The bodily sensation produced in this condition would be akin to that experienced during a brisk gallop on a horse when the wheel eccentricities are in phase. The rider would be nearly lifted off his seat and would feel a seat force varying from zero to twice its normal static value. The cycle motion will transform itself to a simulation of a bucking bronco when the wheel eccentricities are out of phase. These effects diminish as the square of the forward velocity, falling to 4/9 of g at 10 mph and 1/9 g at 5 mph for example.

Figure 6:
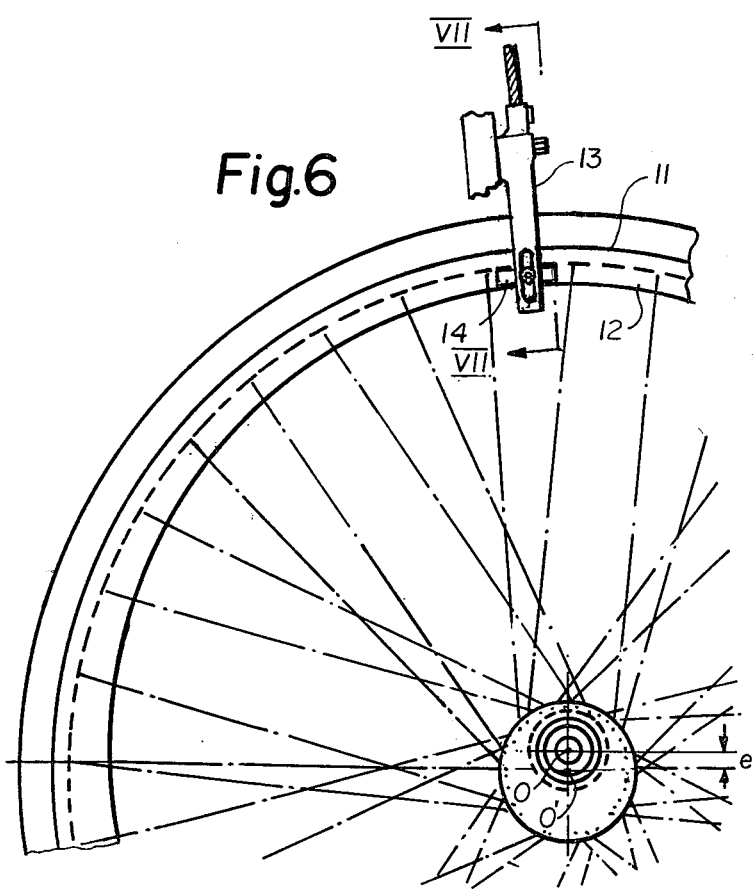
FIG. 6 is a fragmentary elevation of a caliper type brake applied to the wheel of FIGS. 4 and 5.
Figure 7:
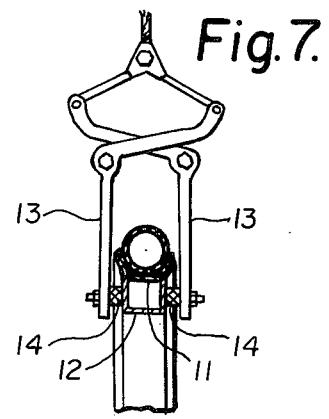
FIG. 7 is a cross-sectional view taken along line VII—VII of FIG. 6.
Figure 8:
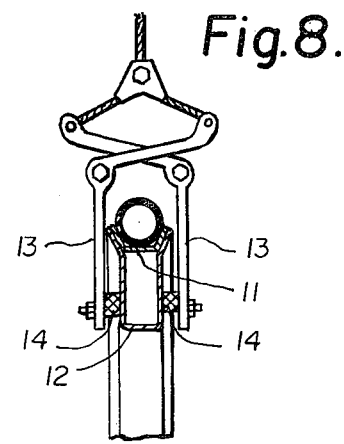
FIG. 8 is a view similar to FIG. 7 but taken along a substantially diametrically opposite portion of the wheel.

Caliper brakes are applied to the wheel rim by cable actuation by means of hand grips. When the wheel rim radius with respect to the wheel axle is varying from point to point, either due to axle eccentricity with respect to the wheel rim center or due to predetermined wheel out-of-roundness, then caliper brakes may still be used by the means shown in FIGS. 6, 7 and 8. What is required is an auxiliary braking rim that is concentric with respect to the wheel axle. This makes the braking radius constant even though the bicycle wheel itself has a variable radius. Such an auxiliary rim is 12, which is joined by welding or brazing to the bicycle wheel rim 11. The radial depth of rim flange 12 varies from point to point because of the eccentricity e of its center O with respect to the wheel center 0'. However, the braking track remains at a constant radius as the wheel turns on its axle. The difference between this caliper brake and an ordinary one is that the brake lever arms 13 must be sufficiently longer to allow the varying wheel radius to move up between the caliper arms 13 as the eccentricity e moves to its lower position in FIG. 6. The wheel, tire, and brake configuration for that condition is shown in FIG. 8. The configuration for the axle position of FIG. 6 is shown in FIG. 7. The total braking rim displacement in the radial direction is thus 2e between these two extremes. The brake shoes are 14.

To prevent undue axial deflection of the brake flanges 12 due to pressure of the brake shoes 14, the flanges 12 can be turned axially toward each other at the inner radius, so as to provide an axial support. The wheel spokes may then be admitted to the wheel rim either through holes in the turned in flanges 12, or through notches in the inner flange edges of the two separate flange halves.

It is worth noting that the pedal effort with this bicycle will be no greater than with the conventional bicycle, since energy expended to cause the rider to rise will be recovered after the rider reaches the peak and starts to descent to the lowest position during the oscillation. Forward velocity will also be maintained substantially constant by the system momentum.

The bicycle of FIG. 1 is equipped with wheels 1 in which the axle 0 is displaced from the geometric center 0' of the circular wheel by the eccentricity e, as shown in greater detail in FIG. 6. This is the preferred embodiment of my invention.

Figure 3:
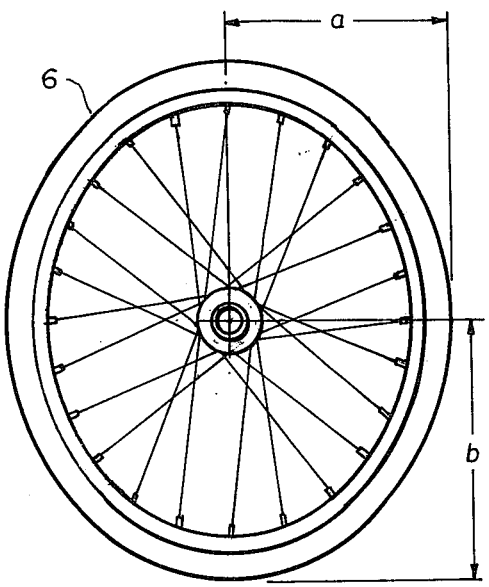
FIG. 3 is an enlarged plan view of a modification showing an elliptical or substantially elliptical wheel.
Figure 4:
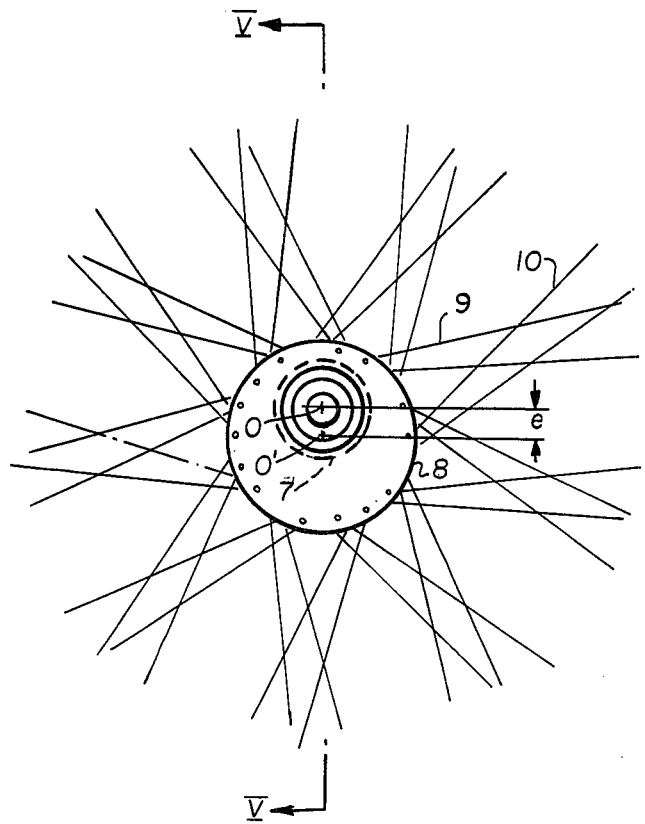
FIGS. 4 and 5 are fragmentary elevation and side views respectively, of the hub portion of a modification of the wheels.
Figure 5:
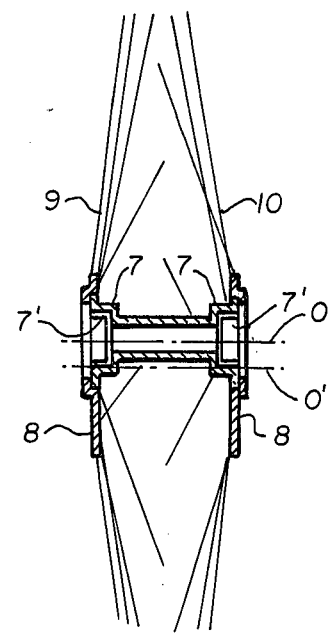

Alternatively, oscillations of the bicycle frame can be produced by using wheels in the shape of an ellipse 6, or similar curve, which modification is shown in FIG. 3. For an ellipse whose major axis is 2a and minor axis 2b, the effective eccentricity is $$e = \tfrac{1}{2}(a-b) \qquad (7)$$

Figure 2:
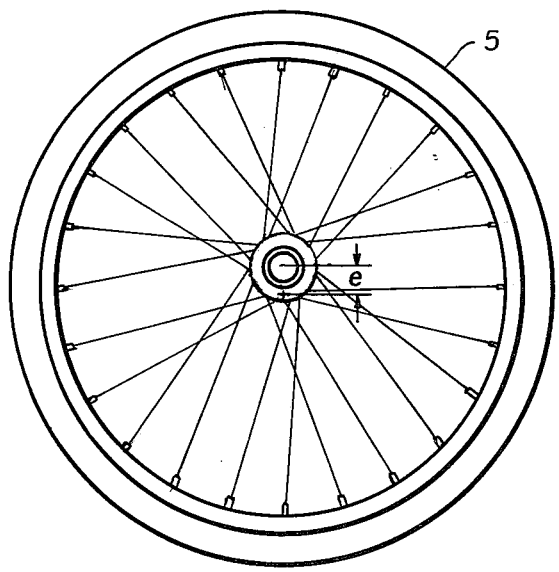
FIG. 2 is an enlarged plan view of one of the eccentric wheels of FIG. 1.

Since such a wheel profile has two peaks and two valleys, the oscillation frequency for a given V will be twice that obtained with the system of FIGS. 1 and 2. Also, for a given eccentricity and forward speed, the vertical acceleration at each wheel will be four times as great for the FIG. 3 modification. Thus a bicycle design based on FIG. 3 will require a smaller wheel out-of-roundness for a given vertical acceleration, and will produce a different rider sensation due to the doubled oscillation frequencies. Experimental testing of the effects on the rider should be done to determine, for the particular rider, the comparative merits of the wheels to FIGS. 2 and 3.

Thus it will be seen that I have provided an efficient and highly effective exercising bicycle that will give a vigorous and complete body movement to the rider, simulating that when driving a horse, so as to stiumulate blood circulation of the rider; also I have provided a bicycle construction that is relatively simple and inexpensive as well as flexible in operation by merely changing one or both wheels.

While I have illustrated and described several embodiments of my invention, it will be understood that these are by way of illustration only and that various changes and modifications may be contemplated within the scope of the following claims.

I claim:

1. A bicycle adapted for foward travel and equipped with circular wheels having concentric circular hubs, eccentrically mounted axles on said hubs whose axles are displaced radially from the geometric wheel centers for the purpose of imparting a sinusoidal vertical oscillation to said axles and attached bicycle frame and its rider, these oscillations to be superposed on and to be the result of the forward motion of the bicycle, a caliper brake including movable shoes mounted so as to surround a perimetrical portion of one of said wheels, and an auxiliary rim mounted on the rim of said wheel having a braking track concentric with said wheel axles for frictional engagement by said shoes.

* * * * *